United States Patent
Yokoyama et al.

(10) Patent No.: US 11,061,297 B2
(45) Date of Patent: Jul. 13, 2021

(54) NONLINEAR OPTICALLY ACTIVE COPOLYMER INTO WHICH ALICYCLIC GROUP HAS BEEN INTRODUCED

(71) Applicants: KYUSHU UNIVERSITY, Fukuoka (JP); NISSAN CHEMICAL INDUSTRIES, LTD., Tokyo (JP)

(72) Inventors: Shiyoshi Yokoyama, Fukuoka (JP); Hiroki Miura, Fukuoka (JP); Daisuke Maeda, Funabashi (JP); Kei Yasui, Funabashi (JP); Tsubasa Kashino, Funabashi (JP); Masaaki Ozawa, Funabashi (JP)

(73) Assignees: KYUSHU UNIVERSITY, Fukuoka (JP); NISSAN CHEMICAL INDUSTRIES, LTD., Tokyo (JP)

( * ) Notice: Subject to any disclaimer, the term of this patent is extended or adjusted under 35 U.S.C. 154(b) by 69 days.

(21) Appl. No.: 16/084,921

(22) PCT Filed: Mar. 16, 2017

(86) PCT No.: PCT/JP2017/010766
§ 371 (c)(1),
(2) Date: Sep. 13, 2018

(87) PCT Pub. No.: WO2017/159815
PCT Pub. Date: Sep. 21, 2017

(65) Prior Publication Data
US 2019/0085199 A1 Mar. 21, 2019

(30) Foreign Application Priority Data

Mar. 17, 2016 (JP) .............................. JP2016-054531

(51) Int. Cl.
| | | |
|---|---|---|
| *G02F 1/361* | (2006.01) | |
| *C08F 8/30* | (2006.01) | |
| *C08F 8/34* | (2006.01) | |
| *C08F 220/36* | (2006.01) | |
| *C08F 220/18* | (2006.01) | |
| *C09D 5/24* | (2006.01) | |
| *C09D 133/10* | (2006.01) | |
| *G02F 1/365* | (2006.01) | |

(52) U.S. Cl.
CPC .............. *G02F 1/3617* (2013.01); *C08F 8/30* (2013.01); *C08F 8/34* (2013.01); *C08F 220/18* (2013.01); *C08F 220/36* (2013.01); *C09D 5/24* (2013.01); *C09D 133/10* (2013.01); *G02F 1/361* (2013.01); *G02F 1/3615* (2013.01); *C08F 2800/20* (2013.01); *C08F 2810/50* (2013.01); *G02F 1/365* (2013.01)

(58) Field of Classification Search
CPC . C09D 133/10; C09D 5/24; C08F 8/30; C08F 8/34; C08F 220/36; C08F 220/18; G02F 1/3617
See application file for complete search history.

(56) References Cited

U.S. PATENT DOCUMENTS

| 5,384,378 A | 1/1995 | Etzbach et al. | |
|---|---|---|---|
| 2017/0088654 A1* | 3/2017 | Otomo | C08G 18/2815 |
| 2017/0242189 A1 | 8/2017 | Yokoyama et al. | |

FOREIGN PATENT DOCUMENTS

| JP | H06-206936 A | 7/1994 |
|---|---|---|
| JP | H09-100325 A | 4/1997 |
| JP | 2003-301030 A | 10/2003 |
| JP | 2014-44272 A | 3/2014 |
| JP | 2014-130196 A | 7/2014 |
| JP | 2015-178544 A | 10/2015 |
| WO | 2015/141650 A1 | 9/2015 |
| WO | 2016/035823 A1 | 3/2016 |

OTHER PUBLICATIONS

Qui, Feng et al "An electro-optic polymer-cladded TiO2 waveguide modulator" Oct. 26, 2016 Applied Physics Letters 109, 173301). (Year: 2016).*
Piao et al. "Nonlinear Optical Side-Chain Polymers Post-Functionalized with High-β Chromophores Exhibiting Large Electro-Optic Property." Journal of Polymer Science: Part A: Polymer Chemistry, 2011, vol. 49, pp. 47-54.
Jun. 13, 2017 Written Opinion issued in International Patent Application No. PCT/JP2017/010766.
Jun. 13, 2017 Search Report issued in International Patent Application No. PCT/JP2017/010766.
Oct. 10, 2019 extended Search Report issued in European Patent Application No. 17766810.0.
Sep. 7, 2020 Office Action issued in Chinese Patent Application No. 201780016834.3.
Feb. 1, 2021 Office Action issued in Korean Patent Application No. 10-2018-7029865.

* cited by examiner

*Primary Examiner* — Ling Siu Choi
*Assistant Examiner* — David L Miller
(74) *Attorney, Agent, or Firm* — Oliff PLC

(57) ABSTRACT

A nonlinear optically active copolymer having satisfactory orientation characteristics and able to allow for reduction in heat-induced orientation relaxation of a nonlinear optical material, and a nonlinear optical material obtained using the copolymer. The copolymer including at least a repeating unit A having adamantyl group and a repeating unit B having a nonlinear optically active moiety in one molecule, and an organic nonlinear optical material including the copolymer as a component.

10 Claims, 7 Drawing Sheets

Vt TRIANGULAR-WAVE VOLTAGE (APPLIED VOLTAGE)
Lv CHANGE IN LIGHT INTENSITY
   (CHANGE IN OUTGOING LIGHT INTENSITY)
Vπ HALF-WAVE VOLTAGE

NONLINEAR OPTICALLY ACTIVE COPOLYMER INTO WHICH ALICYCLIC GROUP HAS BEEN INTRODUCED

TECHNICAL FIELD

The present invention relates to nonlinear optically active copolymers having an organic nonlinear optically active moiety and usable for optical information processing, optical communications or the like such as for optical switching or optical modulation, and particularly relates to a nonlinear optically active copolymer having in a side chain a structure derived from an organic nonlinear optical compound and to an organic nonlinear optical material including the copolymer.

BACKGROUND ART

In the fields of optical information processing, optical communications etc., various photoelectric elements have recently been developed using fluorescent dye-containing materials or nonlinear optical materials. In particular, a nonlinear optical material refers to a material that exhibits polarization response proportional to the square, cube, or higher-order term of the magnitude of an optical electric field, and nonlinear optical materials that show a linear electro-optic effect (Pockels effect) which is a second order nonlinear optical effect are under consideration for use in optical switching, optical modulation etc.

Conventionally, lithium niobate and potassium dihydrogen phosphate have been put into practical use and become widespread as inorganic nonlinear optical materials. In recent years, however, attention has been drawn to organic nonlinear optical materials superior to the above inorganic materials in terms of high nonlinear optical performance, low material cost, and high mass production efficiency, and active research and development have been conducted to enable practical use of the organic nonlinear optical materials.

Known methods of producing a device using an organic material include a method using a single crystal of a compound having nonlinear optical properties (nonlinear optical compound), a vapor deposition method, and an LB film method. There are also a method in which a structure having nonlinear optical properties is introduced into a main chain or side chain of a polymer compound or a method in which a nonlinear optical compound is dispersed in a polymer matrix, or the like. In particular, the use of a polymer system allows film formation by casting, dipping, or spin coating and hence easy processing.

Among the above methods, the method in which a structure having nonlinear optical properties is introduced into a main chain or side chain of a polymer compound is expected to yield optically uniform properties because the nonlinear optical compound can be dispersed at a high concentration without aggregation.

Known examples employing such introduction of a structure having nonlinear optical properties into a main chain or side chain of a polymer compound include: a polymer compound having a methacrylate side chain into which a compound having significant nonlinear optical properties has been introduced (Non Patent Document 1); and an example in which a monomer into which a structure having nonlinear optical properties and an acetylene group have been added is allowed to undergo self-crosslinking with the aim of reducing orientation relaxation over time of the structure having nonlinear optical properties after electric field-induced orientation (poling) of the structure (Patent Document 1).

PRIOR ART DOCUMENTS

Patent Document

[Patent Document 1] Japanese Patent Application Publication No. 2003-301030 (JP 2003-301030 A)

Non Patent Document

[Non Patent Document 1] J. Polym. Sci. A: Polym. Chem., 49, p 47 (2011)

SUMMARY OF THE INVENTION

Problem to be Solved by the Invention

However, the polymer compound described in Non Patent Document 1 has the disadvantage of having a low glass-transition point and tending to undergo orientation relaxation induced by heat. Patent Document 1 mentioned above fails to give any detailed discussion or statement as to thermal curing or in particular orientation relaxation, and the invention described in Patent Document 1 may suffer deterioration in optical properties due to coloring caused by crosslinking of acetylene groups.

Thus, although polymer compounds having a main chain or side chain, into which a structure having nonlinear optical properties has been introduced, have been previously proposed, there remains a need to obtain various characteristics such as transparency and reduced orientation relaxation which are important for use of polymer compounds in optical devices.

It is an object of the present invention to provide: a nonlinear optically active copolymer having satisfactory orientation characteristics and able to allow for reduction in heat-induced orientation relaxation of a nonlinear optical material; and a nonlinear optical material obtained using the copolymer.

Means for Solving the Problem

As a result of intensive investigations aimed at attaining the above object, the present inventors have found that introduction of adamantyl group into a polymer compound can provide reduction in orientation relaxation and have completed the present invention on the basis of this finding.

That is, in a first aspect, the present invention relates to a nonlinear optically active copolymer including at least a repeating unit A having adamantyl group and represented by formula [1] and a repeating unit B having a nonlinear optically active moiety and represented by formula [2] in one molecule:

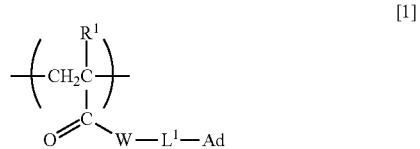

[1]

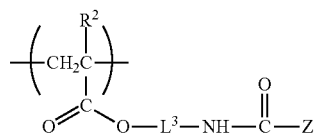

(wherein $R^1$ and $R^2$ are each independently a hydrogen atom or methyl group, W is —O— or —NH—, $L^1$ is a single bond, a divalent $C_{1-30}$ hydrocarbon group optionally containing an ether bond and/or an ester bond, or *-$L^2$-NHC(=O)O— (wherein * is an end bonded to W), $L^2$ and $L^3$ are each independently a divalent $C_{1-30}$ hydrocarbon group optionally containing an ether bond and/or an ester bond, Ad is adamantyl group optionally substituted with a $C_{1-5}$ alkyl group, and Z is an atomic group exhibiting nonlinear optical activity).

In a second aspect, the present invention relates to the nonlinear optically active copolymer according to the first aspect, wherein the Z is an atomic group having a furan ring group represented by formula [3]:

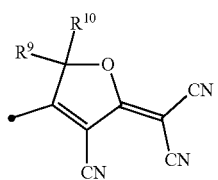

(wherein $R^9$ and $R^{10}$ are each independently a hydrogen atom, a $C_{1-5}$ alkyl group, a $C_{1-5}$ haloalkyl group, or a $C_{6-10}$ aryl group, and the black dot is a bond to the remaining structure of the atomic group Z exhibiting nonlinear optical activity).

In a third aspect, the present invention relates to the nonlinear optically active copolymer according to the second aspect, wherein the Z is an atomic group resulting from removal of one hydrogen atom from any of $R^3$ to $R^8$ and $R^{11}$ to $R^{16}$ of a compound represented by formula [4]:

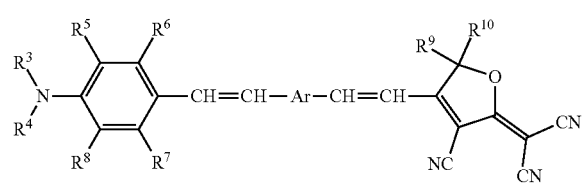

(wherein $R^3$ and $R^4$ are each independently a hydrogen atom, a $C_{1-10}$ alkyl group optionally having a substituent, or a $C_{6-10}$ aryl group optionally having a substituent, the substituent is optionally a group reactive with isocyanate group, $R^5$ to $R^8$ are each independently a hydrogen atom, a $C_{1-10}$ alkyl group, hydroxy group, a $C_{1-10}$ alkoxy group, a $C_{2-11}$ alkylcarbonyloxy group, a $C_{4-10}$ aryloxy group, a $C_{5-11}$ arylcarbonyloxy group, a silyloxy group having a $C_{1-6}$ alkyl group and/or phenyl group, or a halogen atom, $R^9$ and $R^{10}$ are each independently as defined above, and Ar is a divalent aromatic group represented by formula [5] or formula [6])

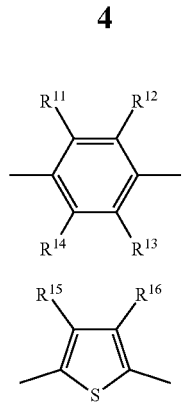

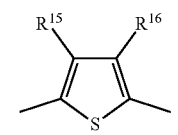

(wherein $R^{11}$ to $R^{16}$ are each independently a hydrogen atom, a $C_{1-10}$ alkyl group optionally having a substituent, or a $C_{6-10}$ aryl group optionally having a substituent, and the substituent is optionally a group reactive with isocyanate group).

In a fourth aspect, the present inventions relates to the nonlinear optically active copolymer according to the third aspect, wherein the bond in the Z is a bond derived from a group present in $R^3$ or $R^4$, the group being reactive with isocyanate group.

In a fifth aspect, the present invention relates to an organic nonlinear optical material including the nonlinear optically active copolymer according to any one of the first to fourth aspects as a component of the material.

In a sixth aspect, the present invention relates to an electro-optic element including the nonlinear optically active copolymer according to any one of the first to fourth aspects.

In a seventh aspect, the present invention relates to an optical switching element including the nonlinear optically active copolymer according to any one of the first to fourth aspects.

In an eighth aspect, the present invention relates to a varnish including the nonlinear optically active copolymer according to any one of the first to fourth aspects.

In a ninth aspect, the present invention relates to a method of producing an organic nonlinear optical material, the method including the steps of: applying the varnish according to the eighth aspect onto a surface of a base material or onto a topmost surface of a single-layer or multilayer structure stacked on a base material to obtain a coating; and applying an electric field to the coating under heating to orient an atomic group exhibiting nonlinear optical activity.

Effects of the Invention

The nonlinear optically active copolymer of the present invention, having a combination of a repeating unit having a nonlinear optically active moiety and a repeating unit having adamantyl group, can reduce orientation relaxation of the nonlinear optical moiety and can be used to obtain an organic nonlinear optical material capable of exhibiting a sufficient electro-optic constant in a reliability test (at 85° C. for 2000 hours, for example).

Additionally, the nonlinear optically active copolymer of the present invention can be dissolved in a solvent to prepare a varnish, which can easily be formed into a desired shape. Thus, the nonlinear optically active copolymer has the advantage of being suitable for use as an easy-to-handle optical material in the field of photoelectric materials.

Furthermore, the organic nonlinear optical material of the present invention allows production of an optical device having a high nonlinear optical constant and capable of being easily formed in a desired shape.

MODES FOR CARRYING OUT THE INVENTION

Nonlinear Optically Active Copolymer

Figure 1:
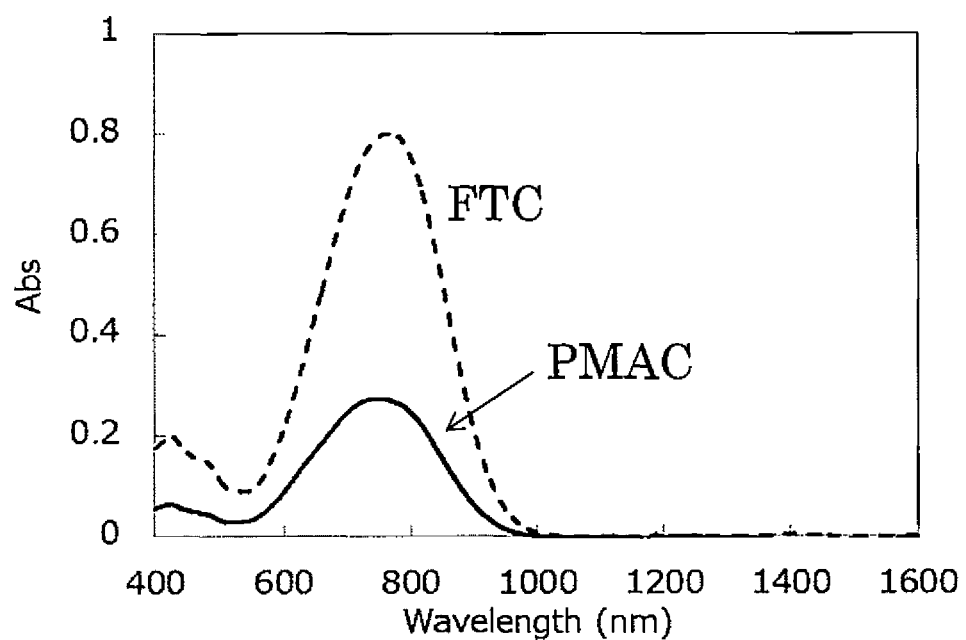
FIG. 1 shows ultraviolet-visible absorption spectra of the adamantyl group-containing nonlinear optically active copolymer PMAC which was obtained in Example 1 and the nonlinear optical compound FTC.

The nonlinear optically active copolymer of the present invention is a nonlinear optically active copolymer including at least a repeating unit A having adamantyl group and represented by formula [1] and a repeating unit B having a nonlinear optically active moiety and represented by formula [2] in one molecule.

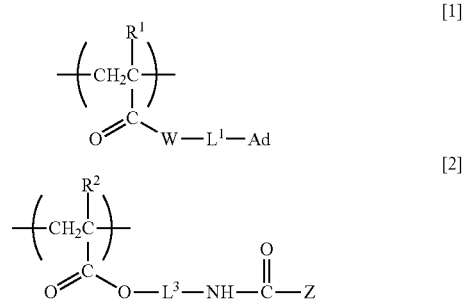

In formula [1] and formula [2] above, $R^1$ and $R^2$ are each independently a hydrogen atom or methyl group.

In formula [1] above, W is —O— or —NH—.

In formula [1] above, $L^1$ is a single bond, a divalent $C_{1-30}$ hydrocarbon group optionally containing an ether bond and/or an ester bond, or *-$L^2$-NHC(=O)O— wherein * is an end bonded to W.

In formula [1] and formula [2] above, $L^2$ and $L^3$ are each independently a divalent $C_{1-30}$ hydrocarbon group optionally containing an ether bond and/or an ester bond.

The divalent $C_{1-30}$ hydrocarbon group may be either an aliphatic group or an aromatic group, and the aliphatic group may be linear, branched, or cyclic. In particular, an aliphatic group is preferred, and a $C_{1-6}$ alkylene group is more preferred.

Examples of such a divalent $C_{1-30}$ hydrocarbon group include: linear aliphatic groups such as methylene group, ethylene group, trimethylene group, tetramethylene group, pentamethylene group, hexamethylene group, octane-1,8-diyl group, decane-1,10-diyl group, icosane-1,20-diyl group, and triacontane-1,30-diyl group; branched aliphatic groups such as methylethylene group, 1-methyltrimethylene group, and 2,2-dimethyltrimethylene group; alicyclic groups such as cyclopentane-1,3-diyl group, cyclohexane-1,4-diyl group, tricyclo[5.2.1.0$^{2,6}$]decanediyl group, adamantanediyl group, norbornanediyl group, and norbornenediyl group; and aromatic groups such as phenylene group and naphthalenediyl group.

In formula [1] above, Ad is adamantyl group optionally substituted with a $C_{1-5}$ alkyl group.

The $C_{1-5}$ alkyl group may have a branched structure or cyclic structure, and examples of the $C_{1-5}$ alkyl group include methyl group, ethyl group, n-propyl group, isopropyl group, cyclopropyl group, n-butyl group, isobutyl group, sec-butyl group, tert-butyl group, cyclobutyl group, n-pentyl group, neopentyl group, and cyclopentyl group.

In formula [2] above, Z is an atomic group exhibiting nonlinear optical activity.

An atomic group exhibiting nonlinear optical activity refers to an atomic group derived from an organic nonlinear optical compound. The organic nonlinear optical compound is desirably a π-conjugated compound that has an electron-donating group at one end of the π-conjugated chain and an electron-withdrawing group at the other end of the π-conjugated chain and that has a high molecular hyperpolarizability β. Examples of the electron-donating group include dialkylamino groups, and examples of the electron-withdrawing group include cyano group, nitro group, and fluoroalkyl groups.

In particular, an example of a preferred atomic group exhibiting nonlinear optical activity in the present invention is an atomic group having a furan ring group represented by formula [3] below.

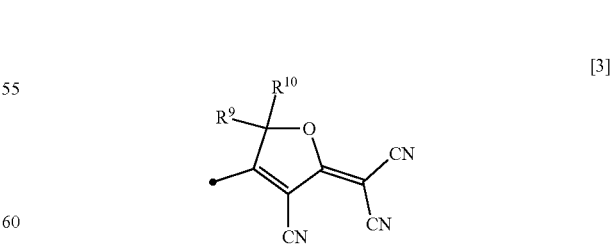

In this formula, $R^9$ and $R^{10}$ are each independently a hydrogen atom, a $C_{1-5}$ alkyl group, a $C_{1-5}$ haloalkyl group, or a $C_{6-10}$ aryl group, and the black dot (•) is a bond to the remaining structure of the atomic group Z exhibiting nonlinear optical activity.

Specifically, the atomic group (Z) exhibiting nonlinear optical activity is preferably an atomic group having a functional group derived from a compound represented by formula [4] below, i.e., an atomic group resulting from removal of one hydrogen atom from any of $R^3$ to $R^8$ and $R^{11}$ to $R^{16}$ of a compound represented by formula [4].

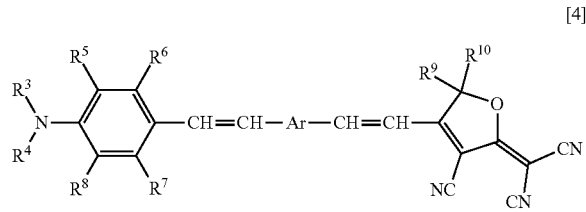

[4]

In formula [4], $R^3$ and $R^4$ are each independently a hydrogen atom, a $C_{1-10}$ alkyl group optionally having a substituent, or a $C_{6-10}$ aryl group optionally having a substituent.

The $C_{1-10}$ alkyl group may have a branched structure or cyclic structure and may be an arylalkyl group. Specific examples of the $C_{1-10}$ alkyl group include methyl group, ethyl group, n-propyl group, isopropyl group, cyclopropyl group, n-butyl group, isobutyl group, sec-butyl group, tert-butyl group, n-pentyl group, neopentyl group, cyclopentyl group, n-hexyl group, cyclohexyl group, n-octyl group, n-decyl group, 1-adamantyl group, benzyl group, and phenethyl group.

Examples of the $C_{6-10}$ aryl group include phenyl group, tolyl group, xylyl group, and naphthyl group.

Examples of the substituent include: amino group; hydroxy group; carboxy group; epoxy groups; alkoxycarbonyl groups such as methoxycarbonyl group and tert-butoxycarbonyl group; silyloxy groups such as trimethylsilyloxy group, tert-butyldimethylsilyloxy group, tert-butyldiphenylsilyloxy group, and triphenylsilyloxy group; and halogen atoms such as fluoro group, chloro group, bromo group, and iodo group.

The bond in the atomic group (Z) is preferably a bond derived from a group present in $R^3$ or $R^4$, the group being reactive with isocyanate group.

In formula [4] above, $R^5$ to $R^8$ are each independently a hydrogen atom, a $C_{1-10}$ alkyl group, hydroxy group, a $C_{1-10}$ alkoxy group, a $C_{2-11}$ alkylcarbonyloxy group, a $C_{4-10}$ aryloxy group, a $C_{5-11}$ arylcarbonyloxy group, a silyloxy group having a $C_{1-6}$ alkyl group and/or phenyl group, or a halogen atom.

Examples of the $C_{1-10}$ alkyl group include groups as mentioned above as examples for $R^3$ and $R^4$.

Examples of the $C_{1-10}$ alkoxy group include a group in which the $C_{1-10}$ alkyl group is bonded to an oxygen atom.

Examples of the $C_{2-11}$ alkylcarbonyloxy group include a group in which the $C_{1-10}$ alkyl group is bonded to carbonyloxy group.

Examples of the $C_{4-10}$ aryloxy group include phenoxy group, naphthalen-2-yloxy group, furan-3-yloxy group, and thiophen-2-yloxy group.

Examples of the $C_{5-11}$ arylcarbonyloxy group include benzoyloxy group, 1-naphthoyloxy group, furan-2-carbonyloxy group, and thiophene-3-carbonyloxy group.

Examples of the silyloxy group having a $C_{1-6}$ alkyl group and/or phenyl group include trimethylsilyloxy group, tert-butyldimethylsilyloxy group, tert-butyldiphenylsilyloxy group, and triphenylsilyloxy group.

Examples of the halogen atom include fluoro group, chloro group, bromo group, and iodo group.

In formula [4], $R^9$ and $R^{10}$ are the same as $R^9$ and $R^{10}$ defined in formula [3] above; namely, $R^9$ and $R^{10}$ in formula [4] are each independently a hydrogen atom, a $C_{1-5}$ alkyl group, a $C_{1-5}$ haloalkyl group, or a $C_{6-10}$ aryl group.

The $C_{1-5}$ alkyl group may have a branched structure or cyclic structure, and examples of the $C_{1-5}$ alkyl group include methyl group, ethyl group, n-propyl group, isopropyl group, cyclopropyl group, n-butyl group, isobutyl group, sec-butyl group, tert-butyl group, cyclobutyl group, n-pentyl group, neopentyl group, and cyclopentyl group.

The $C_{1-5}$ haloalkyl group may have a branched structure or cyclic structure, and examples of the $C_{1-5}$ haloalkyl group include fluoromethyl group, trifluoromethyl group, bromodifluoromethyl group, 2-chloroethyl group, 2-bromoethyl group, 1,1-difluoroethyl group, 2,2,2-trifluoroethyl group, 1,1,2,2-tetrafluoroethyl group, 2-chloro-1,1,2-trifluoroethyl group, pentafluoroethyl group, 3-bromopropyl group, 2,2,3,3-tetrafluoropropyl group, 1,1,2,3,3,3-hexafluoropropyl group, 1,1,1,3,3,3-hexafluoropropan-2-yl group, 3-bromo-2-methylpropyl group, 2,2,3,3-tetrafluorocyclopropyl group, 4-bromobutyl group, perfluoropentyl group, and perfluorocyclopentyl group.

Examples of the $C_{6-10}$ aryl group include phenyl group, tolyl group, xylyl group, and naphthyl group.

In formula [4] above, Ar is a divalent aromatic group represented by formula [5] or formula [6] below.

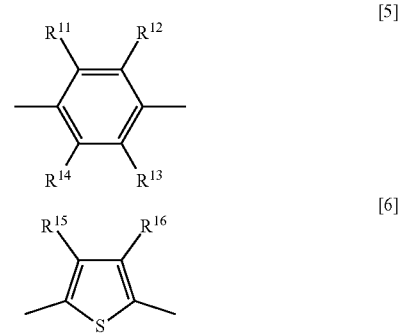

[5]

[6]

In formula [5] and formula [6] above, $R^{11}$ to $R^{16}$ are each independently a hydrogen atom, a $C_{1-10}$ alkyl group optionally having a substituent, or a $C_{6-10}$ aryl group optionally having a substituent Examples of the $C_{1-10}$ alkyl group, the $C_{6-10}$ aryl group, and the substituent include those mentioned above for $R^3$ and $R^4$.

The nonlinear optically active copolymer of the present invention may include a repeating unit (referred to as an "additional repeating unit") other than the repeating unit A represented by formula [1] and the repeating unit B having a nonlinear optically active moiety and represented by formula [2].

For example, a repeating unit for forming a polymer matrix can be introduced into the nonlinear optically active copolymer to adjust the content of the nonlinear optically active moiety. In order to increase the solvent resistance of a formed product (cured layer) obtained from the copolymer and reduce the orientation relaxation of the formed product and in order to allow a formed product to be obtained by thermal curing, a repeating unit having a thermally curable (crosslinkable) structure may be introduced into the nonlinear optically active copolymer.

In view of the fact that the nonlinear optically active copolymer of the present invention is intended for use as an optically active material such as a core of an optical waveguide, the additional repeating unit as described above is desirably selected not to cause any significant adverse effect on the transparency and formability of the copolymer.

Examples of the polymer matrix include resins such as poly(methyl methacrylate), polycarbonate, polystyrene, silicone-type resins, epoxy-type resins, polysulfone, polyethersulfone, and polyimide. Thus, introduction of a repeating unit for forming such a polymer matrix into the nonlinear optically active copolymer can result in a form corresponding to that obtained by copolymerization of the repeating unit A represented by formula [1], the repeating unit B having a nonlinear optically active moiety and represented by formula [2], and the repeating unit of the polymer matrix.

Preferred examples of the thermally curable (crosslinkable) structure include isocyanate group protected by a blocking agent. The blocking agent is not particularly limited as long as the blocking agent can be disassociated by heating (deblocking) to regenerate an active isocyanate group, and examples of the blocking agent include: phenols such as phenol, o-nitrophenol, p-chlorophenol, and o-, m-, or p-crezol; alcohols such as methanol, ethanol, isopropanol, n-butanol, 2-ethoxyhexanol, 2-N,N-dimethylaminoethanol, 2-ethoxyethanol, and cyclohexanol; active methylene group-containing compounds such as dimethyl malonate, diethyl malonate, and methyl acetoacetate; oximes such as acetone oxime, methyl ethyl ketone oxime, methyl isobutyl ketone oxime, cyclohexanone oxime, acetophenone oxime, and benzophenone oxime; lactams such as ε-caprolactam; pyrazoles such as pyrazole, 3,5-dimethylpyrazole, and 3-methylpyrazole; and thiols such as dodecanethiol and benzenethiol.

Examples of the repeating unit having the thermally curable (crosslinkable) structure include a repeating unit represented by formula [7] below.

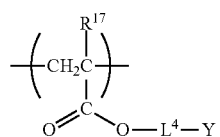

[7]

In formula [7] above, $R^{17}$ is a hydrogen atom or methyl group, $L^4$ is independently a divalent $C_{1-30}$ hydrocarbon group optionally containing an ether bond and/or an ester bond, and Y is isocyanate group protected by a blocking agent.

Examples of the divalent $C_{1-30}$ hydrocarbon group for $L^4$ include groups which are the same as those mentioned above as examples for $L^2$ and $L^3$.

The average molecular weight of the nonlinear optically active copolymer of the present invention which includes at least the repeating unit A represented by formula [1] and the repeating unit B represented by formula [2] is not particularly limited, but the weight-average molecular weight of the nonlinear optically active copolymer is preferably 10,000 to 1,000,000.

The weight-average molecular weight in the present invention refers to a value as measured by gel permeation chromatography (on a polystyrene basis).

The proportions of the repeating unit A represented by formula [1] and the repeating unit B represented by formula [2] in the nonlinear optically active copolymer of the present invention are not particularly limited and, for example, the molar ratio between the repeating units A and B can be 99:1 to 1:99, 99:1 to 50:50, or 95:5 to 50:50.

When the copolymer includes the additional repeating unit, the proportions of the repeating unit A represented by formula [1] and the additional repeating unit are not particularly limited and, for example, the molar ratio between the repeating unit A and the additional repeating unit can be 10:90 to 99:1, 10:90 to 75:25, 10:90 to 50:50, or 25:75 to 90:10. In this case, it is preferable that the ratio between the total number of moles of the repeating unit A represented by formula [1] and the additional repeating unit and the number of moles of the repeating unit B represented by formula [2] be in the range specified above.

Method of Producing Nonlinear Optically Active Copolymer

The nonlinear optically active copolymer of the present invention which includes at least the repeating unit A represented by formula [1] and the repeating unit B represented by formula [2] can be obtained, for example, by copolymerizing a (meth)acrylic acid derivative and/or (meth)acrylamide derivative having adamantyl group with a (meth)acrylic acid derivative having a functional group with which a nonlinear optically active moiety can be introduced, and then by reacting a compound having the nonlinear optically active moiety with the functional group. Examples of the functional group for introduction of the desired moiety include isocyanate group, hydroxy group, carboxy group, an epoxy group, amino group, a halogenated allyl group, and a halogenated acyl group. In the present invention, isocyanate group is used for introduction of a nonlinear optically active moiety to obtain the repeating unit B represented by formula [2].

For example, a (meth)acrylic acid derivative and/or (meth)acrylamide derivative having adamantyl group and a (meth)acrylic acid derivative having an isocyanate group are reacted, and the reaction product is then reacted with a compound having a functional group reactive with isocyanate group and a nonlinear optically active moiety in one molecule. In this way, the nonlinear optically active copolymer of the present invention can be produced.

Examples of the functional group reactive with the isocyanate group include, but are not necessarily limited to: active hydrogen-containing groups such as hydroxy group, amino group, and carboxy group; and epoxy groups from which active hydrogen can be produced. Examples of the nonlinear optically active moiety include moieties derived from the organic nonlinear optical compound mentioned above in the explanation of Z (atomic group exhibiting nonlinear optical activity) in formula [2]. The nonlinear optically active moiety is preferably a moiety having a furan ring group represented by formula [3] above.

Examples of the compound having a functional group reactive with isocyanate group and a nonlinear optically active moiety in one molecule include the above-described compound represented by formula [4]. For example, hydroxy group or amino group present in this compound can react with isocyanate group to give the repeating unit B represented by formula [2] above.

Varnish

When the nonlinear optically active copolymer of the present invention is used as a nonlinear optical material, the nonlinear optically active copolymer is generally used in the form of a thin layer. The method of forming the thin layer is preferably a wet coating process in which the nonlinear optically active copolymer of the present invention is dissolved in a suitable organic solvent to prepare a varnish and this varnish is applied to a suitable base material such as a substrate (examples of which include a silicon/silicon dioxide-coated substrate, a silicon nitride substrate, a substrate coated with a metal such as aluminum, molybdenum, or chromium, a glass substrate, a quartz substrate, and an ITO substrate) or a film (examples of which include resin films such as a triacetyl cellulose film, a polyester film, and an acrylic film) by a technique such as spin coating, flow coating, roll coating, slit coating, slit coating followed by spin coating, inkjet coating, or printing. This varnish is also encompassed by the present invention.

The solvent used in preparation of the varnish is a solvent capable of dissolving the nonlinear optically active copolymer including at least the repeating unit A represented by formula [1] and the repeating unit B represented by formula [2] and also capable of dissolving the below-described additive which may be added if desired. As long as the solvent has such dissolving ability, the type and structure of the solvent are not particularly limited.

Examples of preferred organic solvents include tetrahydrofuran, methyltetrahydrofuran, 1,4-dioxane, diethylene glycol dimethyl ether, acetone, methyl ethyl ketone, cyclopentanone, cyclohexanone, ethyl acetate, cyclohexanol, 1,2-dichloroethane, chloroform, toluene, chlorobenzene, xylene, N,N-dimethylformamide, N,N-dimethylacetamide, dimethyl sulfoxide, chlorobenzene, and propylene glycol methyl ether. These solvents may be used alone, or two or more of these solvents may be used in combination.

Among these solvents, tetrahydrofuran, cyclopentanone, and chloroform are more preferred from the viewpoint of a high ability to dissolve the copolymer including at least the repeating units A and B represented by formulae [1] and [2] and of good coating properties.

The solids content in the varnish is, for example, 0.5 to 30% by mass or 5 to 30% by mass. The term "solids content" as used herein refers to the mass of the materials (the nonlinear optically active copolymer and the below-described additive which may be added if desired) other than the solvent in the varnish.

Thus, the varnish prepared is preferably filtered through a filter having a pore diameter of about 0.2 μm before use.

When the nonlinear optically active copolymer of the present invention includes as the additional repeating unit a repeating unit represented by formula [7] above, a thin layer (formed product) formed from the varnish can be thermally cured (crosslinked). Specifically, a blocking agent protecting isocyanate groups is disassociated by heating (deblocking) to regenerate active isocyanate groups, and the active isocyanate groups react with each other or with another curing agent (crosslinking agent) to undergo curing (crosslinking). The curing (crosslinking) temperature is not particularly limited as long as the curing (crosslinking) temperature is a temperature at which the blocking agent protecting isocyanate groups can be disassociated. The curing (crosslinking) temperature is typically in the range of 100 to 300° C., preferably in the range of 120 to 250° C., and more preferably in the range of 140 to 200° C.

The varnish may, if necessary, contain an antioxidant such as hydroquinone, an ultraviolet absorber such as benzophenone, a rheology modifier such as a silicone oil or a surfactant, an adhesion aid such as a silane coupling agent, a crosslinking agent for the polymer matrix, a compatibilizing agent, a curing agent, a pigment, a storage stabilizer, and an anti-foaming agent, as long as the effect of the present invention is not impaired.

Electro-Optic Element and Optical Switching Element

The nonlinear optically active copolymer of the present invention is applicable as a material for various electro-optic elements conventionally proposed.

Typical examples of the electro-optic elements include optical switching elements (optical communication elements) such as a Mach-Zehnder optical modulator. In the case of an optical switching element, a varnish containing the nonlinear optically active copolymer of the present invention is applied onto a base material such as that made of glass or plastic, and then processing by a technique such as lithography using light or electron beam, wet etching, dry etching, or nanoimprinting is performed to form an optical waveguide structure capable of light propagation. In general, the optical waveguide structure is formed by applying the varnish containing the nonlinear optically active copolymer onto a material having a lower refractive index than the varnish so as to form a layer on the material. The nonlinear optically active copolymer (varnish) of the present invention can be used to form not only such a structure but also another kind of optical waveguide structure.

In a Mach-Zehnder optical modulator which is a typical optical switching element, a high-frequency voltage is applied to either or both of the optical paths of a branched optical waveguide structure to develop electro-optic properties and cause a refractive index change, which leads to a phase variation of propagating light. This phase variation gives rise to a change in light intensity after dividing and combining, thus enabling fast modulation of light.

The electro-optic element as described herein is not limited to that for phase modulation or intensity modulation and can be used, for example, as a polarization conversion element or a dividing/combining element.

Furthermore, the nonlinear optically active copolymer of the present invention can be used not only in communication elements but also in other applications such as in an electric field sensor that detects a change in electric field as a function of a change in refractive index.

An optical waveguide using a varnish containing the nonlinear optically active copolymer of the present invention as a core material can be produced, for example, by a method disclosed in International Patent Application Publication No. 2016/035823 (WO 2016/035823 A1).

Organic Nonlinear Optical Material

In the present invention, poling treatment is necessary to develop second order nonlinear optical properties of a material (such as a thin layer) produced using a varnish containing the nonlinear optically active copolymer. The poling treatment is a process in which a certain electric field is applied to the material in a state where the material has been heated to a temperature equal to or higher than the glass transition temperature of the material and equal to or lower than the melting point of the material, and then the material is cooled under application of the electric field to orient the nonlinear optically active moiety (atomic group exhibiting nonlinear optical activity) contained in the copolymer. This process allows the material to exhibit macroscopic nonlinear optical properties.

Even in the present invention, the orientation of the nonlinear optically active moiety (atomic group exhibiting nonlinear optical activity) is random when the nonlinear optically active copolymer has merely been formed as a varnish into a thin layer. Thus, the thin layer is heated to a temperature which is equal to or higher than a temperature 15° C. below, preferably 10° C. below, the glass transition temperature of the nonlinear optically active copolymer (about 120° C. or higher when the nonlinear optically active copolymer shows no glass transition temperature) and which is equal to or lower than the melting point of the nonlinear optically active copolymer, and the layer is then subjected to poling treatment to develop nonlinear optical properties.

EXAMPLES

Hereinafter, the present invention will be described in more detail with reference to examples. The present invention is not limited to the examples given below.

The apparatuses and conditions used for preparation of samples and analysis of various properties in the examples are as follows.

(1) $^1$H NMR spectrum

Apparatus: NMR System 400NB, available from Agilent Technologies Japan, Ltd.
Solvent: $CDCl_3$
Internal standard: Tetramethylsilane (δ0.00 ppm)

(2) GPC (Gel permeation chromatography)
[Condition A]
Apparatus: HLC-8200 GPC, available from Tosoh Corporation
Column: Shodex (registered trademark) GPC KF-804L+ Shodex GPC KF-805L, available from SHOWA DENKO K.K.
Column temperature: 40° C.
Solvent: THF
Detector: UV (254 nm)
Calibration curve: Standard polystyrene
[Condition B]
Apparatus: HLC-8200 GPC, available from Tosoh Corporation
Column: Shodex (registered trademark) OHpak SB-803 HQ+Shodex OHpak SB-804 HQ, available from SHOWA DENKO K.K.
Column temperature: 40° C.
Solvent: DMF (to which 29.6 mM $H_3PO_4$, 29.6 mM $LiBr.H_2O$, and 0.01% by volume THF were added)
Detector: UV (254 nm)
Calibration curve: Standard polystyrene
[Condition C]
Apparatus: High performance liquid chromatograph LC-2000, available from JASCO Corporation
Column: Shodex (registered trademark) GPC K-804L, available from SHOWA DENKO K.K.
Column temperature: 40° C.
Solvent: THF
Detector: RI
Calibration curve: Standard polystyrene (3) Glass-transition point (Tg) measurement
Apparatus: Photo-DSC 204 F1 Phoenix (registered trademark), available from NETZSCH Japan K.K.
Measurement environment: Nitrogen atmosphere
Temperature rise rate: 30° C./min (−50 to 250° C.)

(4) Ultraviolet-visible absorption spectrum
Apparatus: Ultraviolet-visible-near-infrared spectrophotometer V-670, available from JASCO Corporation (5) Spin coater
Apparatus: ACT-220D, available from ACTIVE Co., Ltd.

(6) Hot plate
Apparatus: MH-3CS+MH-180CS, available from AS ONE Corporation (7) DC power source
Apparatus: Model 2410 High-Voltage Source Meter, available from Keithley Instruments Inc.

(8) Function generator
Apparatus: 33120A, available from Hewlett Packard Co.

(9) Laser generator
Apparatus: 81689A, available from Agilent Technologies Japan, Ltd.

(10) Light detector
Apparatus: S122C, available from Thorlabs, Inc.

(11) Oscilloscope
Apparatus: TDS2024B, available from Tektronix, Inc.

The abbreviations used refer to the following materials.

AdMA: 1-adamantyl methacrylate [Adamantate M-104, available from Idemitsu Kosan Co., Ltd.]

MMA: Methyl methacrylate [available from Tokyo Chemical Industry Co., Ltd.]

MOI: 2-isocyanatoethyl methacrylate [Karenz MOI (registered trademark), available from SHOWA DENKO K.K.]

AIBN: 2,2'-azobis(isobutyronitrile) [V-60, available from Wako Pure Chemical Industries, Ltd.]

DBTDL: Dibutyltin dilaurate [available from Tokyo Chemical Industry Co., Ltd.]

APC: Poly[bisphenol A carbonate-co-(4,4'-(3,3,5-trimethylcyclohexane-1,1-diyl)diphenol carbonate)] [available from Sigma-Aldrich Co., LLC, Tg: 207° C.]

PC: Polycarbonate [available from Sigma-Aldrich Co., LLC, Tg: 147° C.]

DMF: N,N-dimethylformamide

THF: Tetrahydrofuran

Reference Example 1

Production of Nonlinear Optical Compound

A compound shown below [FTC-OH] was used as a nonlinear optical compound to be introduced into a side chain of a polymer. For comparison, a compound shown below [FTC] was used as a nonlinear optical compound to be dispersed in a polymer matrix. These compounds were produced by a technique similar to that disclosed in X. Zhang et al., Tetrahedron Lett., 51, p 5823 (2010).

[FTC-OH]

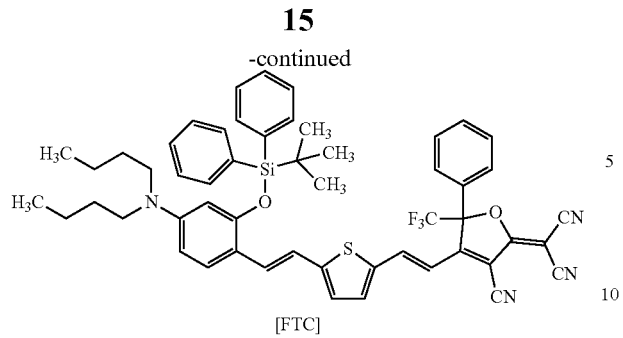

[FTC]

Reference Example 2

Preparation of Clad Material Composition

To a mixed solution of 1.3 g of ethanol and 0.17 g of a 0.1 N aqueous hydrochloric acid solution, 2.3 g of 3-methacryloyloxypropyltrimethoxysilane [available from Tokyo Chemical Industry Co., Ltd.], 0.23 g of zirconium propoxide [available from Tokyo Chemical Industry Co., Ltd.], and 0.02 g of benzoyl peroxide [available from KANTO CHEMICAL CO., INC.] were added, and the mixture was stirred. This mixture was stored at 10° C. or lower for 12 hours or more to prepare a clad material composition.

Example 1

Production of Adamantyl Group-Containing Nonlinear Optically Active Copolymer (PMAC)

(1) Production of Intermediate PcMA

Under nitrogen atmosphere, 5.0 g (50 mmol) of MMA, 11.0 g (50 mmol) of AdMA, 3.9 g (25 mmol) of MOI, and 0.41 g (2.5 mmol) of AIBN were dissolved in 71 g of deoxygenated THF, and the solution was stirred at 65° C. for 2 hours. After being left to cool to room temperature (about 23° C.), the reaction mixture was added to 654 g of hexane to precipitate a polymer. The precipitate was collected by filtration and dried under reduced pressure at room temperature (about 23° C.) to obtain 11.0 g of a white powder of a target product (PcMA) having repeating units represented by formulae [M], [A], and [I] below (yield=55%).

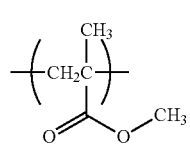

[M]

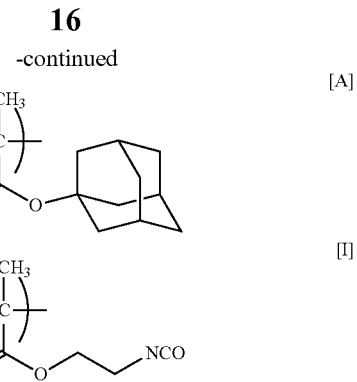

(2) Production of PMAC

Under nitrogen atmosphere, 9.0 g of PcMA as prepared above (containing 11 mmol of isocyanate group), 6.0 g (8.7 mmol) of the nonlinear optical compound [FTC-OH] shown in Reference Example 1, and 0.11 g (0.17 mmol) of DBTDL were dissolved in 133 g of THF, and the solution was stirred at room temperature (about 23° C.) for 48 hours. Thereafter, 4.0 g (124 mmol) of methanol was added to the solution, which was further stirred at room temperature for 24 hours. The resulting reaction mixture was subjected to reprecipitation with 792 g of methanol, and the precipitate was collected by filtration and dried under reduced pressure at 60° C. to obtain 12.4 g of a dark green powder of a target product (PMAC) having repeating units represented by formulae [M], [A], [C], and [U] below (yield=83%).

An ultraviolet-visible absorption spectrum of the obtained target product is shown in FIG. 1 together with a spectrum of the same mass of FTC. The content of a structure derived from the nonlinear optical compound [FTC-OH] in PMAC, as determined from the maximum absorption intensity in the ultraviolet-visible absorption spectrum, was 34% by mass. The weight-average molecular weight Mw and polydispersity index Mw (weight-average molecular weight)/Mn (number-average molecular weight) of the target product, as measured by GPC (condition B) on a polystyrene basis, were 49,000 and 4.4, respectively, and the glass-transition temperature Tg of the product as measured by DSC was 172.5° C.

Further, PMAC was dissolved in THF to prepare a THF solution containing about 5% by mass of PMAC, and this solution was dialyzed to remove the nonlinear optical compound [FTC-OH] remaining in PMAC. The dialysis was carried out by placing the PMAC/THF solution in a dialysis tube [Spectra/Por 3, available from Funakoshi Co., Ltd.], and this dialysis tube was stirred in a 1 L THF bath. This was repeated until elution of FTC-OH from the dialysis tube completed. Thereafter, the solution in the tube was concentrated and subjected to reprecipitation with methanol. The precipitate was collected by filtration to obtain a powder of PMAC.

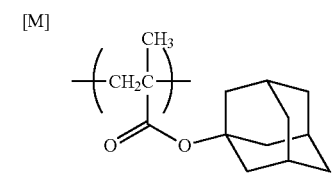

-continued

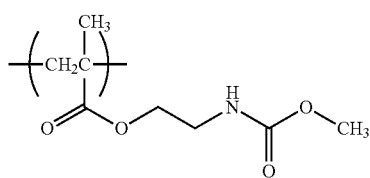

[U]

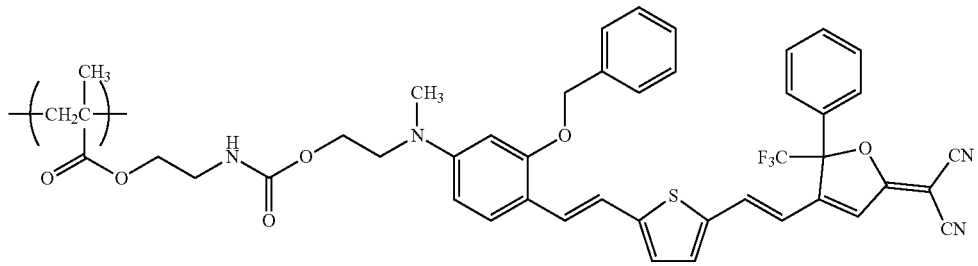

[C]

Example 1-2

Production of Adamantyl Group-Containing Nonlinear Optically Active Copolymer (PMAC2)

(1) Production of Intermediate PcMA2

Under nitrogen atmosphere, 2.5 g (25 mmol) of MMA, 16.5 g (75 mmol) of AdMA, 3.9 g (25 mmol) of MOI, and 0.44 g (2.5 mmol) of AIBN were dissolved in 75 g of deoxygenated THF, and the solution was stirred at 60° C. for 2.5 hours. After being left to cool to room temperature (about 23° C.), the reaction mixture was added to 524 g of hexane to precipitate a polymer. The precipitate was collected by filtration and dried under reduced pressure at 50° C. to obtain 10.3 g of a white powder of a target product (PcMA2) having repeating units represented by formulae [M], [A], and [I] above (yield=46%).

(2) Production of PMAC2

Under nitrogen atmosphere, 1.0 g of PcMA2 as prepared above (containing 1.1 mmol of isocyanate group), 0.43 g (0.62 mmol) of the nonlinear optical compound [FTC-OH] shown in Reference Example 1, and 0.05 g (0.08 mmol) of DBTDL were dissolved in 22 g of THF, and the solution was stirred at room temperature (about 23° C.) for 48 hours. Thereafter, 3.2 g (99 mmol) of methanol was added to the solution, which was further stirred at room temperature for 24 hours. The resulting reaction mixture was subjected to reprecipitation with 400 g of methanol, and the precipitate was collected by filtration and dried under reduced pressure at 40° C. to obtain 1.3 g of a dark green powder of a target product (PMAC2) having repeating units represented by formulae [M], [A], [C], and [U] above (yield=81%).

Further, PMAC2 was dissolved in THF to prepare a THF solution containing about 5% by mass PMAC2, and this solution was dialyzed to remove the nonlinear optical compound [FTC-OH] remaining in PMAC2. The dialysis was carried out by placing the PMAC2/THF solution in a dialysis tube [Spectra/Por 3, available from Funakoshi Co., Ltd.], and this dialysis tube was stirred in a 1 L THF bath. This was repeated until elution of FTC-OH from the dialysis tube ceased. Thereafter, the solution in the tube was concentrated and subjected to reprecipitation with hexane. The precipitate was collected by filtration to obtain a powder of PMAC2.

The content of a structure derived from the nonlinear optical compound [FTC-OH] in PMAC2, as determined from the maximum absorption intensity in an ultraviolet-visible absorption spectrum of the obtained target product as in Example 1, was 24% by mass. The weight-average molecular weight Mw and polydispersity index Mw/Mn of the target product, as measured by GPC (condition C) on a polystyrene basis, were 31,000 and 2.3, respectively, and the glass-transition point Tg of the product as measured by DSC was 194° C.

Production Example 1

Production of Nonlinear Optically Active Copolymer (PMC) without Adamantyl Group (1) Production of Intermediate PcM Under nitrogen atmosphere, 10.0 g (100 mmol) of MMA, 3.9 g (25 mmol) of MOI, and 0.41 g (2.5 mmol) of AIBN were dissolved in 43 g of toluene, and the solution was stirred at 65° C. for 3 hours. After being left to cool to room temperature (about 23° C.), the reaction mixture was added to 694 g of hexane to precipitate a polymer. The precipitate was collected by filtration and dried under reduced pressure at room temperature (about 23° C.) to obtain 9.6 g of a white powder of a target product (PcM) having repeating units represented by formulae [M] and [I] below (yield=69%)

Figure 2:
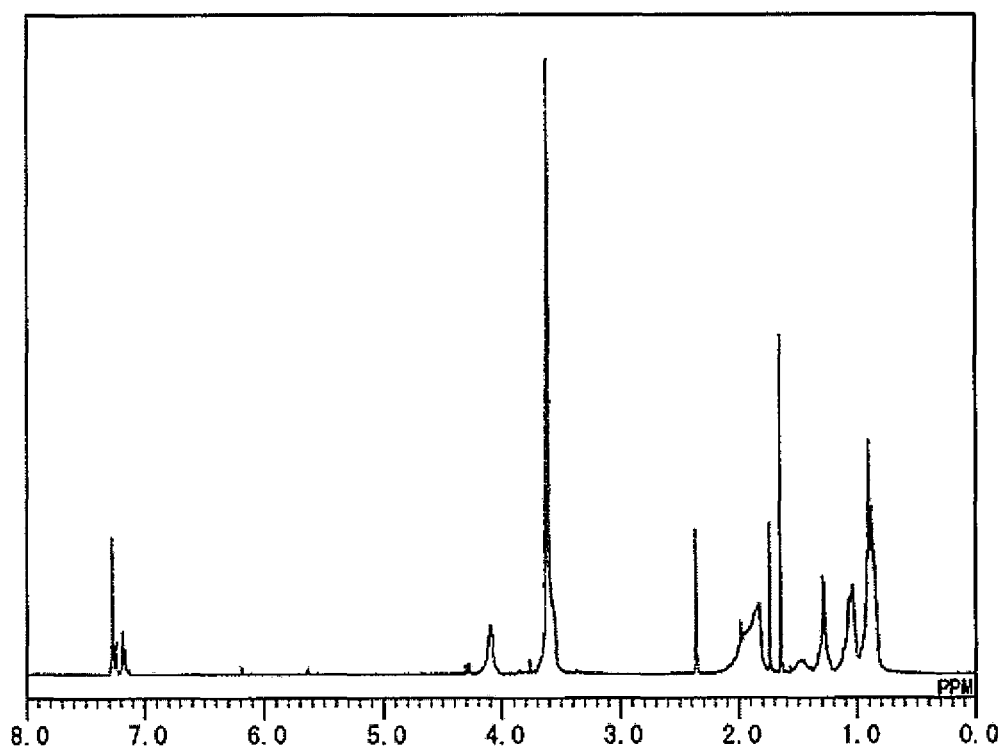
FIG. 2 shows a $^1$H NMR spectrum of the intermediate PcM obtained in Production Example 1.

A $^1$H NMR spectrum of the obtained target product is shown in FIG. 2. The repeating unit composition (molar ratio) as calculated from the $^1$H NMR spectrum was as follows: formula [M]:formula [I]=80:20. The weight-average molecular weight Mw and polydispersity index (Mw/Mn) of the target product, as measured by GPC (condition A) on a polystyrene basis, were 46,000 and 2.1, respectively.

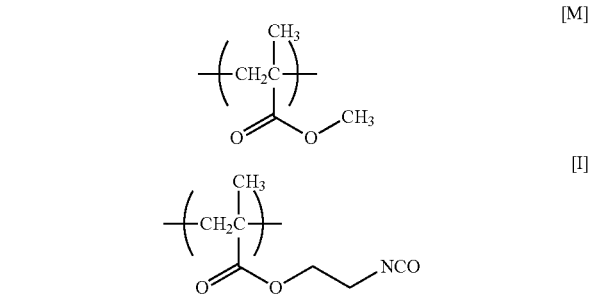

(2) Production of PMC

Under nitrogen atmosphere, 5.7 g of PcM as prepared above (containing 8 mmol of isocyanate group), 0.63 g (0.92 mmol) of the nonlinear optical compound [FTC-OH] shown in Reference Example 1, and 0.38 g (0.6 mmol) of DBTDL were dissolved in 228 g of THF, and the solution was stirred at room temperature (about 23° C.) for 88 hours. Thereafter, 22.8 g (0.71 mol) of methanol was added to the solution, which was further stirred at room temperature for 48 hours. The resulting reaction mixture was subjected to reprecipitation with 2,300 g of hexane, and the precipitate was collected by filtration and dried under reduced pressure at 60° C.

The resulting solid was dissolved in 127 g of THF, and the solution was subjected to reprecipitation with 1,200 g of a heptane-ethyl acetate mixture (at a mass ratio of 3:2). The precipitate was collected by filtration and dried under reduced pressure at 60° C. to obtain 3.9 g of a dark green powder of a target product (PMC) having repeating units represented by formulae [M], [C], and [U] below (yield=61%).

Figure 3:
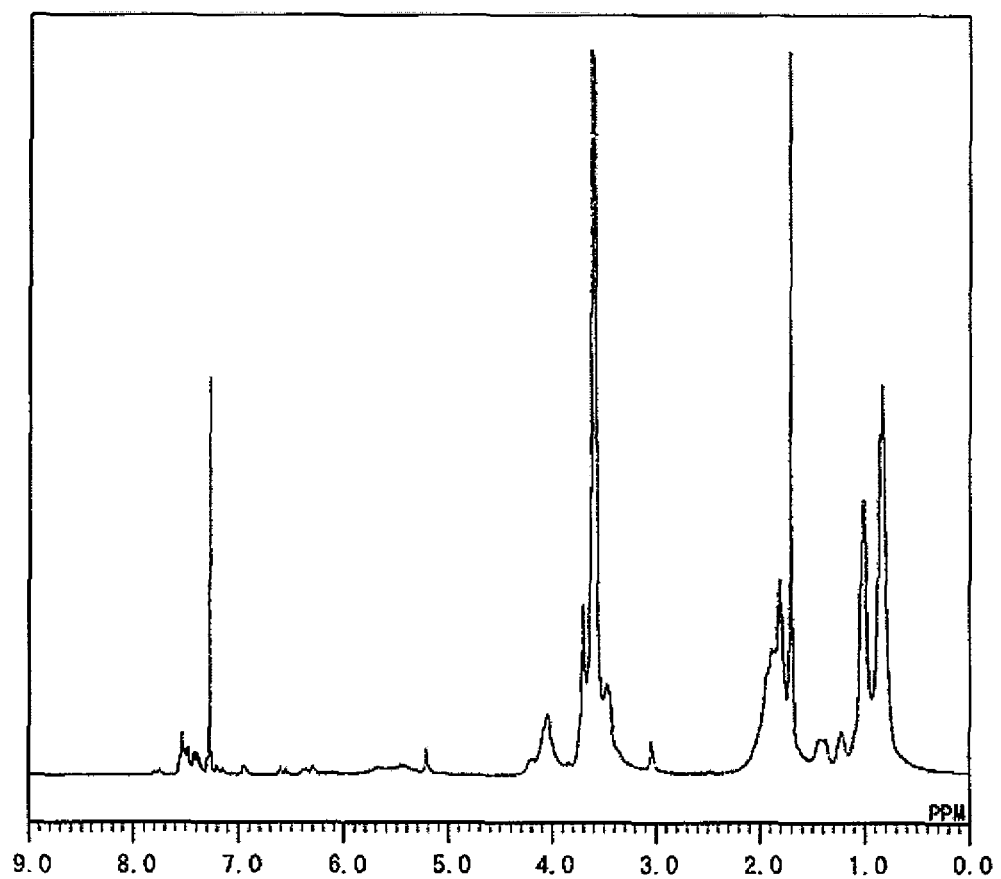
FIG. 3 shows a $^1$H NMR spectrum of the nonlinear optically active copolymer PMC having no adamantyl group which was obtained in Production Example 1.

A $^1$H NMR spectrum of the obtained target product is shown in FIG. 3. The repeating unit composition (molar ratio) as calculated from the $^1$H NMR spectrum was as follows: formula [M]:formula [C]:formula [U]=80:1:19. The content of a structure derived from the nonlinear optical compound [FTC-OH] in PMC was 8% by mass. The weight-average molecular weight Mw and polydispersity index (Mw/Mn) of the target product, as measured by GPC (condition B) on a polystyrene basis, were 88,000 and 2.9, respectively, and the glass-transition point Tg of the product as measured by DSC was 117.5° C.

(1) Production of Bottom Electrode

Figure 4:
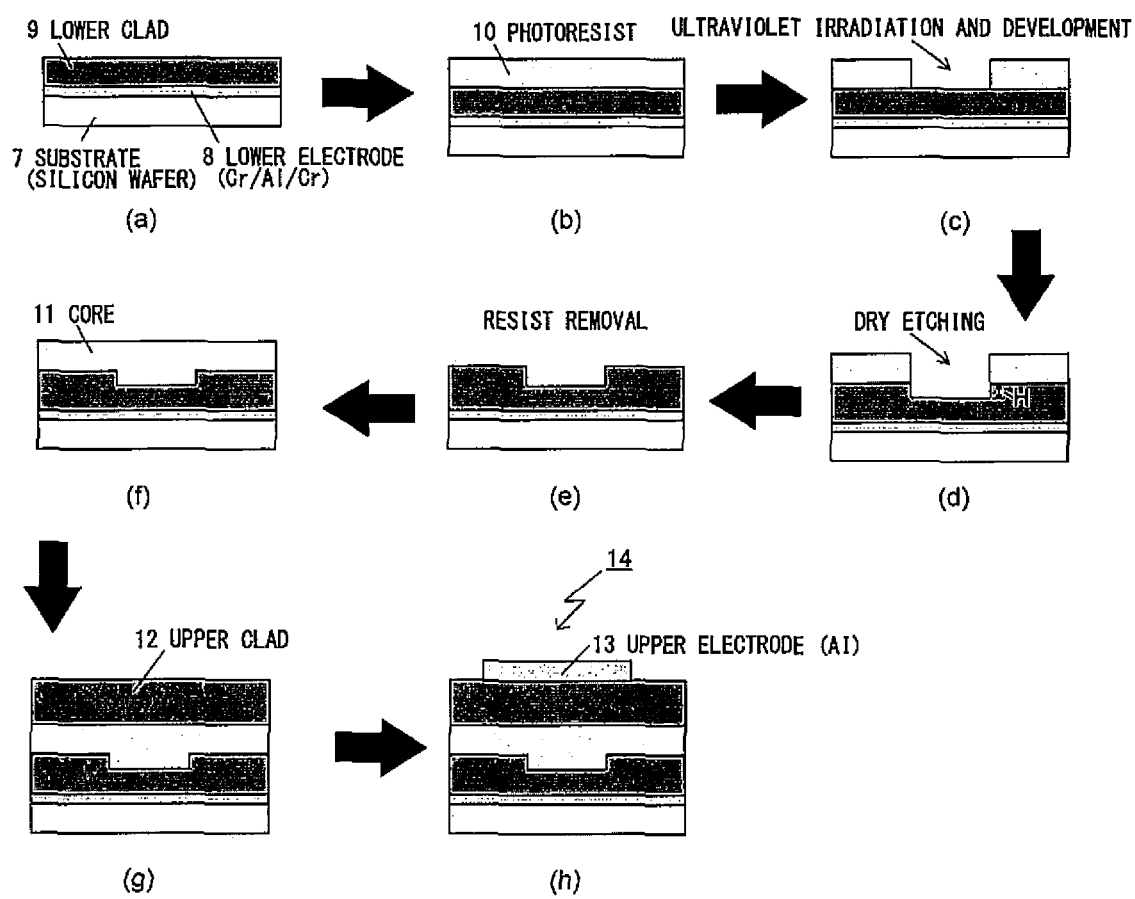
FIG. 4 is a flow-chart diagram illustrating the fabrication process for the ridge optical waveguide produced in Example 2.

Metals, in particular chromium (50 nm), aluminum (400 to 500 nm), and chromium (50 nm), were vapor-deposited in this order on a substrate (silicon wafer) 7 to produce a bottom electrode 8 (FIG. 4 (a)).

(2) Production of Bottom Clad

A clad material composition prepared according to Reference Example 2 was applied onto the bottom electrode by spin coating (at 2,000 rpm for 60 seconds) and heated using a hot plate at 140° C. for 30 minutes to produce a bottom clad 9 (FIG. 4 (a)). The thickness of the bottom clad produced was 2.3 to 2.6 μm.

A photoresist 10 [MICROPOSIT (registered trademark) 51813G, available from Rohm and Haas Electronic Materials K.K.] was applied onto the bottom clad to a thickness of about 3 μm and heated at 90° C. for 3 minutes (FIG. 4 (b)). The photoresist was irradiated with ultraviolet light through a photomask having a 5 μm-wide, 25 mm-long straight waveguide pattern by means of a mask aligner [available from MIKASA CO., LTD], and was then developed (FIG. 4 (c)) using a developer [MICROPOSIT (registered trademark) M319, available from Rohm and Haas Electronic Materials K.K.].

With the resist pattern serving as a mask, the bottom clad 9 was etched by $SF_6$ reactive gas using an ICP dry etching apparatus to form an inverted ridge pattern in the bottom clad 9. The etching was performed in such a manner that the height of the ridge (indicated by H in the figure) was 800 to 900 nm (FIG. 4 (d)). The photoresist was removed, and thus the bottom clad 9 with an inverted ridge pattern was obtained (FIG. 4 (e)).

(3) Production of Core

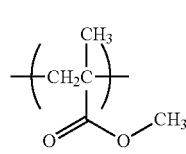 [M]

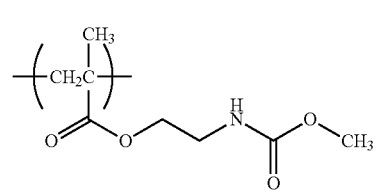 [U]

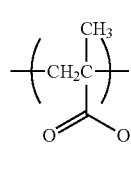 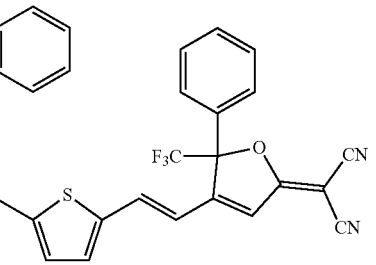 [C]

Example 2

Production of Ridge Optical Waveguide Modulator

A ridge optical waveguide modulator was produced according to the following procedures (see FIG. 4) using the clad material composition obtained in Reference Example 2 for formation of clads and using, for formation of a core, the adamantyl group-containing nonlinear optically active copolymer (PMAC) obtained in Example 1, the nonlinear optically active copolymer (PMC) without adamantyl group which was obtained in Production Example 1, or the nonlinear optical compound shown in Reference Example 1.

A 10% by mass cyclopentanone solution of PMAC produced according to Example 1 was used as a core material and applied on top of the bottom clad 9 with an inverted ridge pattern by spin coating (at 1,000 rpm for 60 seconds). The solution was dried using a hot plate at 85° C. for 30 minutes and then dried under vacuum at 85° C. for 48 hours to produce a core 11 (FIG. 4 (f)). The thickness of the core 11 produced was 1.7 μm.

(4) Production of Upper Clad

A material identical to that used for the bottom clad was used to form a cured layer (2.4 μm) as an upper clad 12 (FIG. 4 (g)) on the core 11 according to procedures similar to those for producing the bottom clad, except that the heating conditions were changed to 120° C. and 1 hour.

(5) Production of Upper Electrode

Aluminum (100 nm) was vacuum-deposited on the upper clad 12 to produce an upper electrode 13 (FIG. 4 (h)).

Finally, both of the end surfaces of the waveguide were cut by substrate cleavage to form a light-incident end surface. Thus, an optical waveguide modulator (optical waveguide 14) was completed.

Example 2-2

Production of Ridge Optical Waveguide Modulator

A ridge optical waveguide modulator was produced in the same manner as in Example 2, except for using PMAC2 produced according to Example 1-2 as a core material instead of PMAC. The thickness of the core was 1.5 μm.

Comparative Example 1

A ridge optical waveguide modulator was produced in the same manner as in Example 2, except for using as a core material a 10% by mass of cyclopentanone solution prepared with PMC produced according to Production Example 1 rather than with PMAC. The thickness of the core was 1.7 μm.

Comparative Example 2

A ridge optical waveguide modulator was produced in the same manner as in Example 2, except for using as a core material a 10% by mass of cyclopentanone solution prepared with a mixture of 3 parts by mass of PC and 1 part by mass of the nonlinear optical compound [FTC] shown in Reference Example 1 rather than with PMAC. The thickness of the core was 2.0 μm.

Comparative Example 3

A ridge optical waveguide modulator was produced in the same manner as in Example 2, except for using as a core material a 10% by mass of cyclopentanone solution prepared with a mixture of 3 parts by mass of APC and 1 part by mass of the nonlinear optical compound [FTC] shown in Reference Example 1 rather than with PMAC. The thickness of the core was 2.4 μm.

Polarization Orientation (Poling) Treatment

Figure 5:
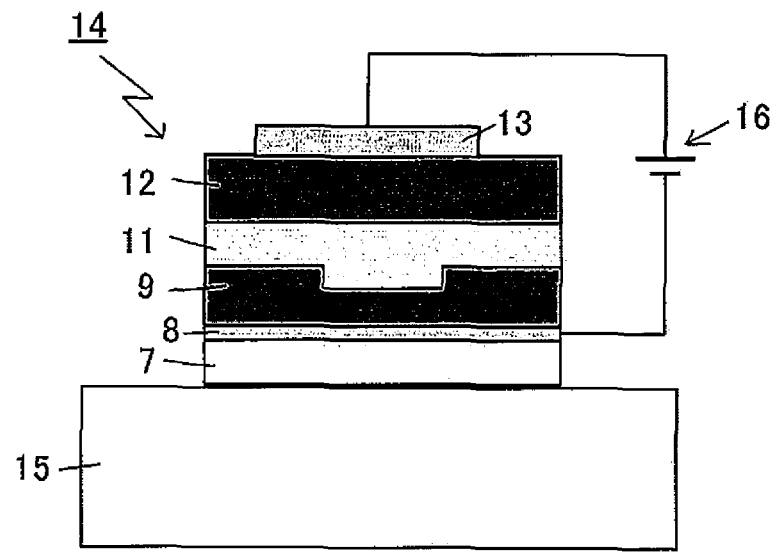
FIG. 5 is a conceptual diagram of an apparatus used for polling treatment of the ridge optical waveguide produced in Example 2.

A voltage was applied to each of the optical waveguides produced as above to carry out poling treatment of the nonlinear optically active copolymer or nonlinear optical compound in the core 11. A conceptual diagram of the apparatus used for the poling treatment is shown in FIG. 5.

Specifically, the optical waveguide 14 is heated and held at a temperature shown in Table 1 on the hot plate 15, and a voltage shown in Table 1 is applied via the upper electrode 13 and the bottom electrode 8 to carry out poling treatment for about 1 minute. This was followed by rapid cooling to fix the orientation, and then the voltage application was stopped. The optical waveguide after poling treatment was subjected to the below-described evaluation of electro-optic properties.

TABLE 1

Poling Conditions of Optical Waveguide Modulators and Their Half-Wave Voltage (Vπ) Characteristics

| | | Poling conditions | | Half-wave |
|---|---|---|---|---|
| | Core material | Temperature [° C.] | Applied voltage [V] | voltage Vπ [V] |
| Example 2 | PMAC | 168 | 400 | 3.6 |
| Example 3 | PMAC2 | 189 | 700 | 5.6 |
| Comparative Example 1 | PMC | 140 | 400 | 2.6 |
| Comparative Example 2 | FTC/PC | 120 | 590 | 8.8 |
| Comparative Example 3 | FTC/APC | 170 | 450 | 10.0 |

Electro-Optic Properties of Optical Waveguide Modulator

Characterization of each of the optical waveguide modulators subjected to poling treatment as above was carried out. A conceptual diagram of the apparatus used for the characterization is shown in FIG. 6.

Figure 6:
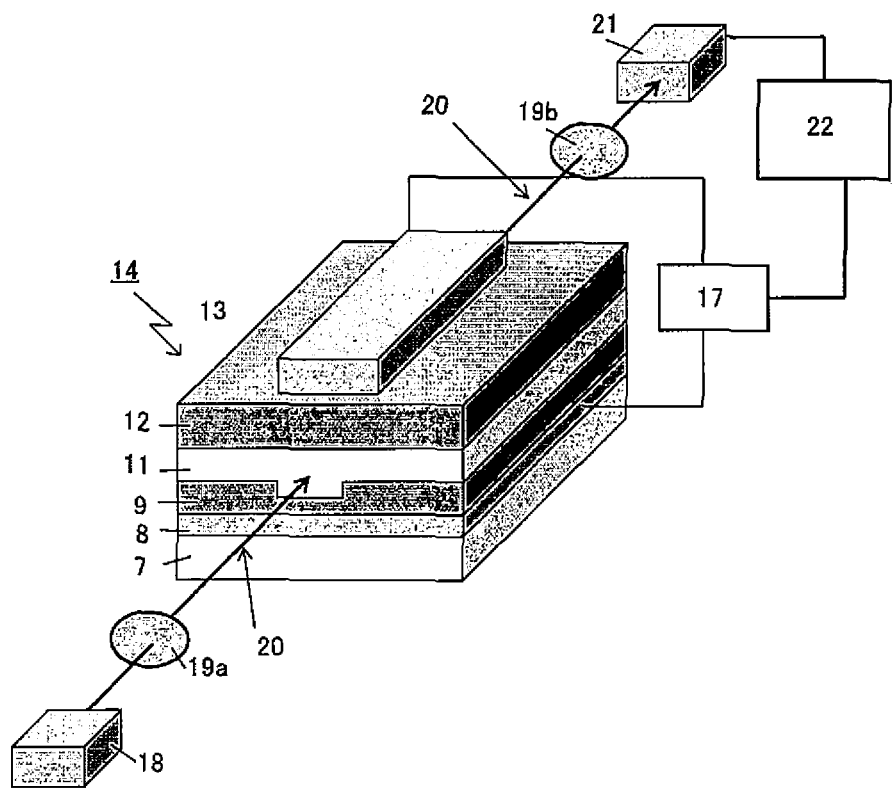
FIG. 6 is a conceptual diagram of an apparatus used for characterization of the ridge optical waveguide produced in Example 2.

As shown in FIG. 6, a laser beam of 1,550 nm wavelength was emitted from a laser generator 18 and put into an end surface of the optical waveguide 14 at an angle of 45° using an optical fiber 20 and a polarizer 19a. A triangular-wave voltage was applied between the upper and bottom electrodes (8, 13) using a function generator 17. The intensity of the outgoing light from an end surface opposite to the laser beam-incident end surface was measured using a photo detector 21. A −45° polarizer 19b was placed before the photo detector on which the outgoing light was incident.

Figure 7:
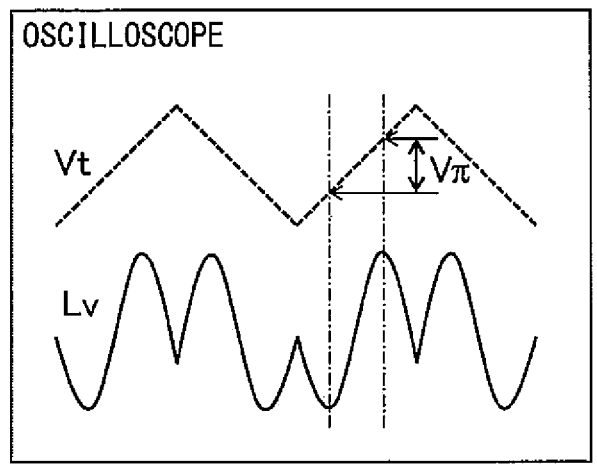
FIG. 7 shows a relationship between a triangular-wave voltage (applied voltage), a change in light intensity (change in output light intensity), and a half-wave voltage (Vπ).

The outgoing light intensity obtained by this measurement method varies in proportion to $\sin^2(\Gamma/2)$ as a function of the applied voltage ($\Gamma$ is a phase difference caused by voltage application and is proportional to $\pi(V/V\pi)$, wherein V denotes an applied voltage and Vπ denotes a half-wave voltage). Thus, the phase difference $\Gamma$ caused by voltage application was analyzed using the outgoing light intensity measured by the photo detector to evaluate the half-wave voltage (Vπ) (see FIG. 7). A smaller Vπ indicates that the optical waveguide modulator is a superior element requiring a smaller driving voltage. The results are also shown in Table 1.

Each of the optical waveguide modulators of Example 2 and Comparative Examples 1 to 3 which had been subjected to poling treatment as above was heated on a hot plate at 85° C. for 2,000 hours, and the change in half-wave voltage (Vπ) during the heating was evaluated. The results are shown in FIG. 8.

The optical waveguide modulator of Example 3 which had been subjected to poling treatment as above was heated on a hot plate at 85° C. for 1,000 hours and at 105° C. for 1,000 hours, and the change in half-wave voltage (Vπ) (increase or decrease caused by heating) was evaluated. The results are shown in FIG. 9 (85° C.) and FIG. 10 (105° C.).

Figure 8:
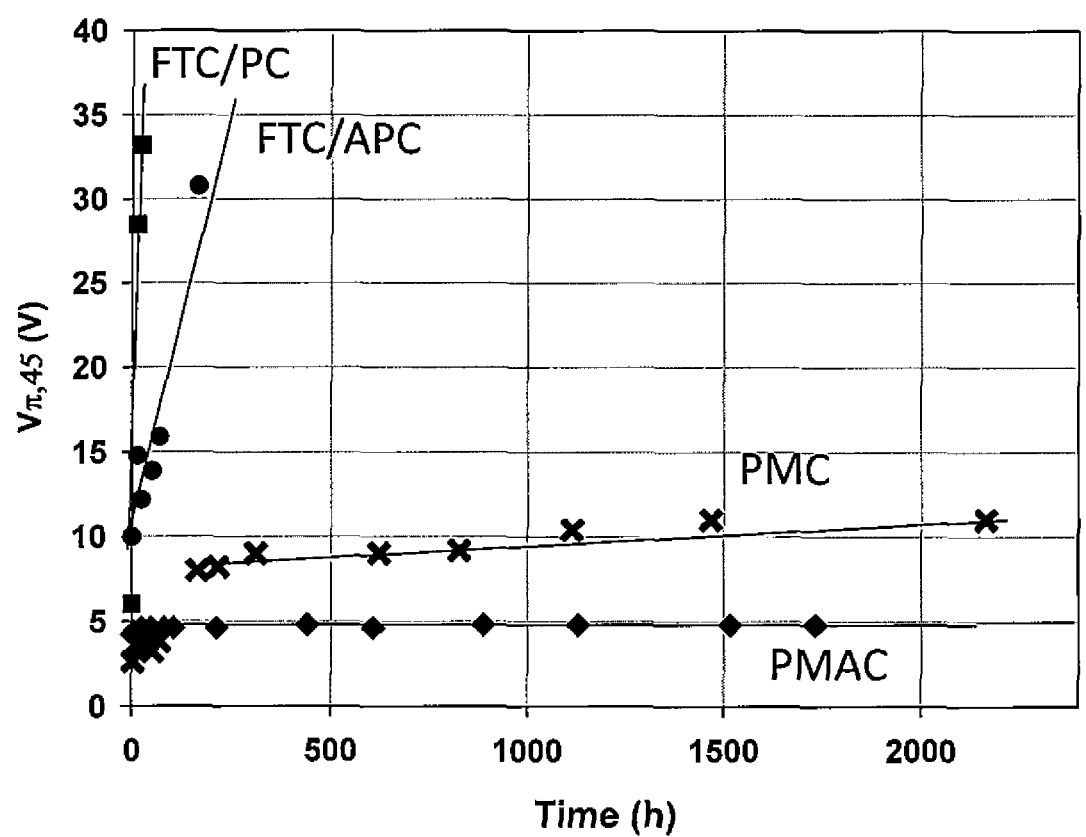
FIG. 8 shows changes in half-wave voltage (orientation relaxation) induced by heating for the optical waveguides produced in Example 2 and Comparative Examples 1 to 3.
Figure 9:
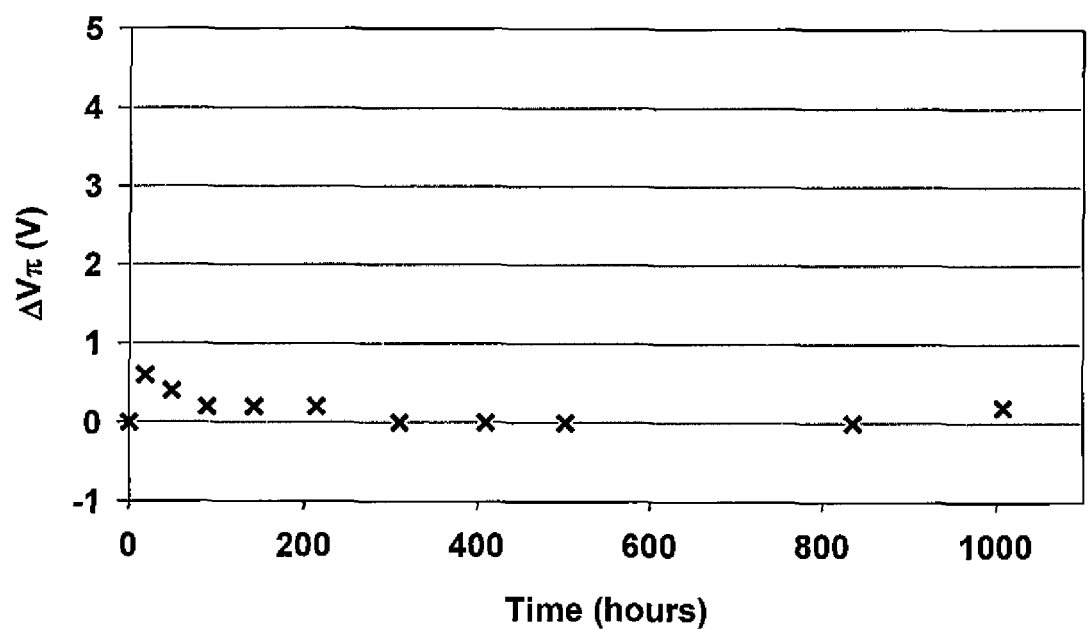
FIG. 9 shows a change in half-wave voltage (orientation relaxation) induced by heating at 85° C. for the optical waveguide produced in Example 3.
Figure 10:
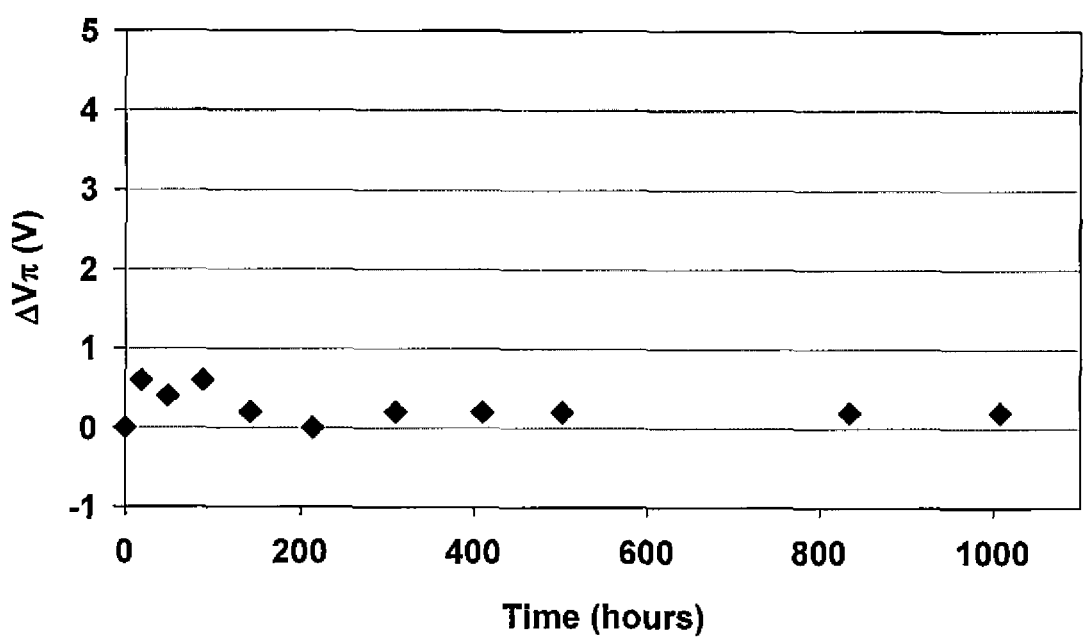
FIG. 10 shows a change in half-wave voltage (orientation relaxation) induced by heating at 105° C. for the optical waveguide produced in Example 3.

As shown in Table 1 and FIGS. 8 to 10, the Vπ of the optical waveguide modulators (Examples 2 and 3) produced using an adamantyl group-containing nonlinear optically active copolymer (PMAC or PMAC2) as a core material was comparable to that of the modulator produced using a nonlinear optically active copolymer (PMC) without adamantyl group (Comparative Example 1) and smaller than that of the modulator producing using a polymer matrix in which a nonlinear optical compound (FTC) was dispersed (Comparative Examples 2 and 3). This confirmed that the optical waveguide modulators of Examples 2 and 3 are superior elements. Additionally, the optical waveguide modulators of Examples 2 and 3 were much more resistant to heat-induced orientation relaxation than those of all of Comparative Examples, which confirmed that the optical waveguide modulators of Examples 2 and 3 had a very high capacity for Vπ retention.

DESCRIPTION OF THE REFERENCE NUMERALS

7 . . . Substrate (silicon wafer)
8 . . . Bottom electrode
9 . . . Bottom clad
10 . . . Photoresist
11 . . . Core
12 . . . Upper clad
13 . . . Upper electrode
14 . . . Optical waveguide
15 . . . Hot plate
16 . . . DC power source
17 . . . Function generator
18 . . . Laser generator
19 (19a, 19b) . . . Polarizer
20 . . . Optical fiber
21 . . . Photo detector
22 . . . Oscilloscope

The invention claimed is:

1. A nonlinear optically active copolymer comprising, in one molecule:

a repeating unit A having adamantyl group and represented by formula [1]:

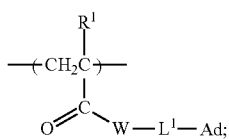

a repeating unit B having a nonlinear optically active moiety and represented by formula [2]:

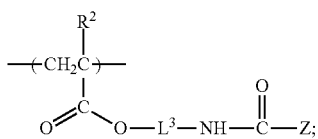

and
a methyl methacrylate repeating unit,
wherein:
$R^1$ and $R^2$ are each independently a hydrogen atom or methyl group,
W is —O— or —NH—,
$L^1$ is a single bond, a divalent $C_{1-30}$ hydrocarbon group optionally containing an ether bond and/or an ester bond, or *-$L^2$-NHC(=O)O— wherein * is an end bonded to W,
$L^2$ and $L^3$ are each independently a divalent $C_{1-30}$ hydrocarbon group optionally containing an ether bond and/or an ester bond, Ad is adamantyl group optionally substituted with a $C_{1-5}$ alkyl group, and
Z is an atomic group exhibiting nonlinear optical activity.

2. The nonlinear optically active copolymer according to claim 1, wherein the Z is an atomic group having a furan ring group represented by formula [3]:

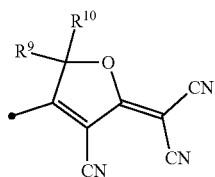

wherein:
$R^9$ and $R^{10}$ are each independently a hydrogen atom, a $C_{1-5}$ alkyl group, a $C_{1-5}$ haloalkyl group, or a $C_{6-10}$ aryl group, and
the black dot represents a bonding site to a remaining structure of the atomic group Z exhibiting nonlinear optical activity.

3. The nonlinear optically active copolymer according to claim 2, wherein the Z is an atomic group resulting from removal of one hydrogen atom from any of $R^3$ to $R^8$ and $R^{11}$ to $R^{16}$ of a compound represented by formula [4]:

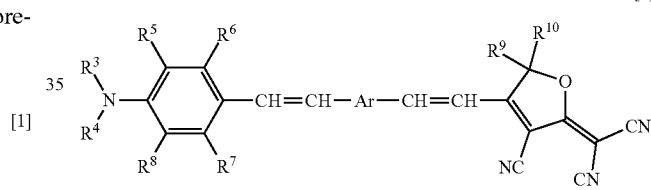

wherein:
$R^3$ and $R^4$ are each independently a hydrogen atom, a $C_{1-10}$ alkyl group optionally having a substituent, or a $C_{6-10}$ aryl group optionally having a substituent, and the substituent is optionally a group reactive with an isocyanate group,
$R^5$ to $R^8$ are each independently a hydrogen atom, a $C_{1-10}$ alkyl group, hydroxy group, a $C_{1-10}$ alkoxy group, a $C_{2-11}$ alkylcarbonyloxy group, a $C_{4-10}$ aryloxy group, a $C_{5-11}$ arylcarbonyloxy group, a silyloxy group having a $C_{1-6}$ alkyl group and/or phenyl group, or a halogen atom,
$R^9$ and $R^{10}$ are each independently as defined above, and
Ar is a divalent aromatic group represented by formula [5] or formula [6]

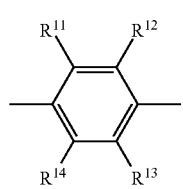

-continued

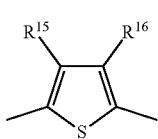

wherein $R^{11}$ to $R^{16}$ are each independently a hydrogen atom, a $C_{1-10}$ alkyl group optionally having a substituent, or a $C_{6-10}$ aryl group optionally having a substituent, and the substituent is optionally a group reactive with an isocyanate group.

4. The nonlinear optically active copolymer according to claim 3, wherein the Z is an atomic group resulting from removal of one hydrogen atom from a group present in $R^3$ or $R^4$, the group being reactive with isocyanate group.

5. An organic nonlinear optical material comprising the nonlinear optically active copolymer according to claim 1 as a component of the material.

6. An electro-optic element comprising the nonlinear optically active copolymer according to claim 1.

7. An optical switching element comprising the nonlinear optically active copolymer according to claim 1.

8. A varnish comprising the nonlinear optically active copolymer according to claim 1.

9. A method of producing an organic nonlinear optical material, the method comprising the steps of:
    applying the varnish according to claim 8 onto a surface of a base material or onto a topmost surface of a single-layer or multilayer structure stacked on a base material to obtain a coating; and
    applying an electric field to the coating under heating to orient an atomic group exhibiting nonlinear optical activity.

10. The nonlinear optically active copolymer according to claim 3, wherein $R^3$ or $R^4$ is a $C_{1-10}$ alkyl group having a group reactive with isocyanate or a $C_{6-10}$ aryl group having a group reactive with isocyanate.

* * * * *